(No Model.)

J. W. TERMAN.
TRACTION ENGINE.

No. 333,360. Patented Dec. 29, 1885.

Witnesses:
R. H. Orwig.
W. F. Anderson.

Inventor:
James W. Terman,
By Thomas G. Orwig, Atty.

UNITED STATES PATENT OFFICE.

JAMES W. TERMAN, OF DES MOINES, IOWA, ASSIGNOR OF THREE-FOURTHS TO H. S. BUTLER, OF SAME PLACE.

TRACTION-ENGINE.

SPECIFICATION forming part of Letters Patent No. 333,360, dated December 29, 1885.

Application filed June 1, 1885. Serial No. 167,174. (No model.)

*To all whom it may concern:*

Be it known that I, JAMES W. TERMAN, a citizen of the United States, residing at Des Moines, in the county of Polk and State of Iowa, have invented a new and useful combined propelling and brake mechanism, for traction-engines, hoisting-machines, &c., of which the following is a specification.

The object of my invention is to simplify the construction of traction-engines, and to increase their utility, by combining the propelling and brake mechanisms, thus dispensing with the brake mechanism heretofore in use on engines of this kind, whereby a considerable saving is effected, both in the power required to run the engine and in the cost of manufacturing the same. I attain this object by the mechanism illustrated in the accompanying drawings, in which—

Figure 1:
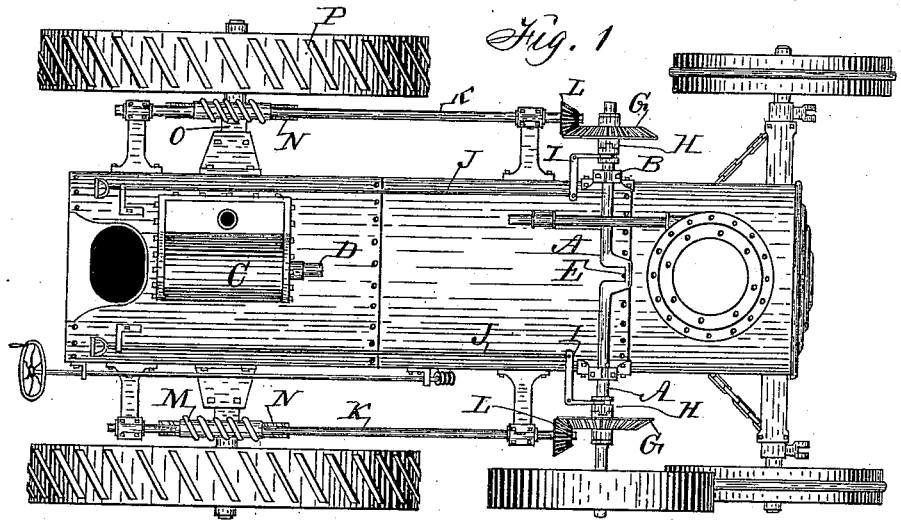
Figure 2:
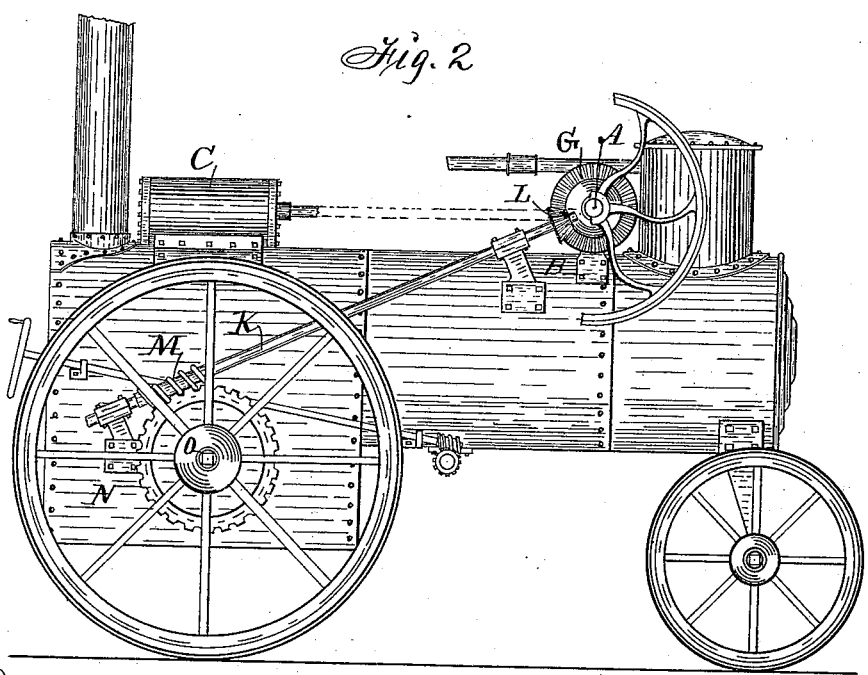

Figure 1 is a top view of a traction-engine provided with my combined propelling and brake mechanism. Fig. 2 is a side view of the same.

Similar letters refer to similar parts throughout the several views.

A is a shaft, rotating in bearings B B, attached to the boiler-shell.

C is the steam-cylinder of the engine, the piston-rod D of which is connected to a crank, F, formed on the shaft A.

G G are bevel gear-wheels loosely mounted on the shaft A.

H H are clutches, feathered on the shaft A in such a manner that they can be thrown in and out of gear with the bevel-wheels G G by means of bell-cranks I I and rods J J, as shown.

K K are inclined shafts rotating in bearings fixed to the boiler-shell, as shown. Upon the upper ends of the shafts K K are bevel gear-wheels L L, engaging the bevel-wheels G G on the shaft A. Upon the lower ends of the shafts K K are worms M M, engaging worm-wheels N N, fixed to the driving-axle O of the engine.

In the practical operation of my invention steam is admitted to the cylinder, the motion of the piston is communicated to the shaft A; thence to the shafts K K and worms M M, which drive the worm-wheels N N, fixed on the driving-axle O. The rear wheels, P P, being also fixed on the axle O, rotate with it, causing the engine to advance. When it is desired to retard the motion, simply reduce the supply of steam to the cylinder, when the worms, rotating with diminished speed, will act as brakes upon the driving-axle O. To stop the engine, shut off the steam from the cylinder or throw the clutches H H out of gear. To turn the engine, throw that clutch out of gear which is upon the side of the engine toward which it is desired to turn. An ordinary steering-gear, fitted to the front axle in the usual way, co-operates with the clutch in turning the engine.

It will be seen that this device performs the functions of a propelling mechanism and also that of a brake mechanism, thus dispensing with a great deal of machinery heretofore in use on engines of this kind.

This device is also adapted for hoisting-machines, especially such as are used in hoisting great weights.

I am aware that all the elements in my combined propelling and brake mechanism are common, and that worms and worm-wheels have been used for transmitting power from an engine to the traction-wheels of a carriage; but my manner of arranging and combining worms and clutches with a driving-shaft having a single crank, so that the driver-wheels can be operated jointly or separately at pleasure, as required to regulate the speed and to direct the line of advance and turning about of the carriage, is novel and greatly advantageous.

I claim as my invention and desire to secure by Letters Patent—

In a traction-engine, a combined propelling, brake, and steering mechanism composed of the following elements, to wit: a shaft, A, driven from the cylinder C, having upon it loose bevel gear-wheels G G and clutches H H, and shafts K K, driven from the shaft A, having worms M M engaging worm-wheels N N, fixed to the driving-axle, all arranged to operate substantially as shown and described, for the purpose specified.

JAMES W. TERMAN.

Witnesses:
C. D. HUDGENS,
THOMAS G. ORWIG.